(12) United States Patent
Yang et al.

(10) Patent No.: US 8,602,204 B2
(45) Date of Patent: Dec. 10, 2013

(54) CONVEYING DEVICE

(75) Inventors: Bo Yang, Shenzhen (CN); Yong Zhang, Shenzhen (CN); Bing Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 89 days.

(21) Appl. No.: 13/451,787

(22) Filed: Apr. 20, 2012

(65) Prior Publication Data

US 2013/0075231 A1 Mar. 28, 2013

(30) Foreign Application Priority Data

Sep. 27, 2011 (CN) .......................... 2011 1 0293924

(51) Int. Cl.
*B65G 47/34* (2006.01)
(52) U.S. Cl.
USPC ................ 198/468.9; 198/343.2; 198/750.1; 198/751
(58) Field of Classification Search
USPC ............ 198/468.9, 468.01, 343.2, 750.1, 751
See application file for complete search history.

(56) References Cited

U.S. PATENT DOCUMENTS

| | | | | |
|---|---|---|---|---|
| 5,690,567 | A * | 11/1997 | DeNijs et al. | 474/73 |
| 6,662,934 | B1 * | 12/2003 | Iida | 198/750.1 |
| 7,591,368 | B2 * | 9/2009 | Cheng et al. | 198/750.2 |
| 2002/0070099 | A1 * | 6/2002 | Neely | 198/750.1 |

* cited by examiner

*Primary Examiner* — Leslie A Nicholson, III
*Assistant Examiner* — Keith R Campbell
(74) *Attorney, Agent, or Firm* — Altis Law Group, Inc.

(57) ABSTRACT

A conveying device includes a base, a sliding mechanism and a bearing mechanism. The base includes a mounting plate and a fixed bracket fixed on the mounting plate. The sliding mechanism includes a bottom plate slidably mounted on the mounting plate, a mounting platform fixedly mounted upon the bottom plate, a conveying assembly and a driver. The conveying assembly includes a driving wheel, a driven member and a conveying belt sleeved on the driving wheel and the driven member. The driver is mounted on the bottom plate and connected with the driving wheel. The bearing mechanism is slidably mounted on the mounting platform, and fixed with the conveying belt. The driving wheel and the driven member are oppositely and rotatably mounted on the bottom plate, the fixed bracket is positioned adjacent to the driven member and fixed with the conveying belt.

15 Claims, 4 Drawing Sheets

CONVEYING DEVICE

BACKGROUND

1. Technical Field

The present disclosure relates to conveying devices, and more particularly, to a conveying device for conveying workpieces or products on a multi-workstation assembly line.

2. Description of Related Art

Conveying devices convey workpieces or products on a multi-workstation assembly line, during a manufacturing or an assembling process. However, such conveying device has a complicated structure, and takes up a large space during usage with complicated structure.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
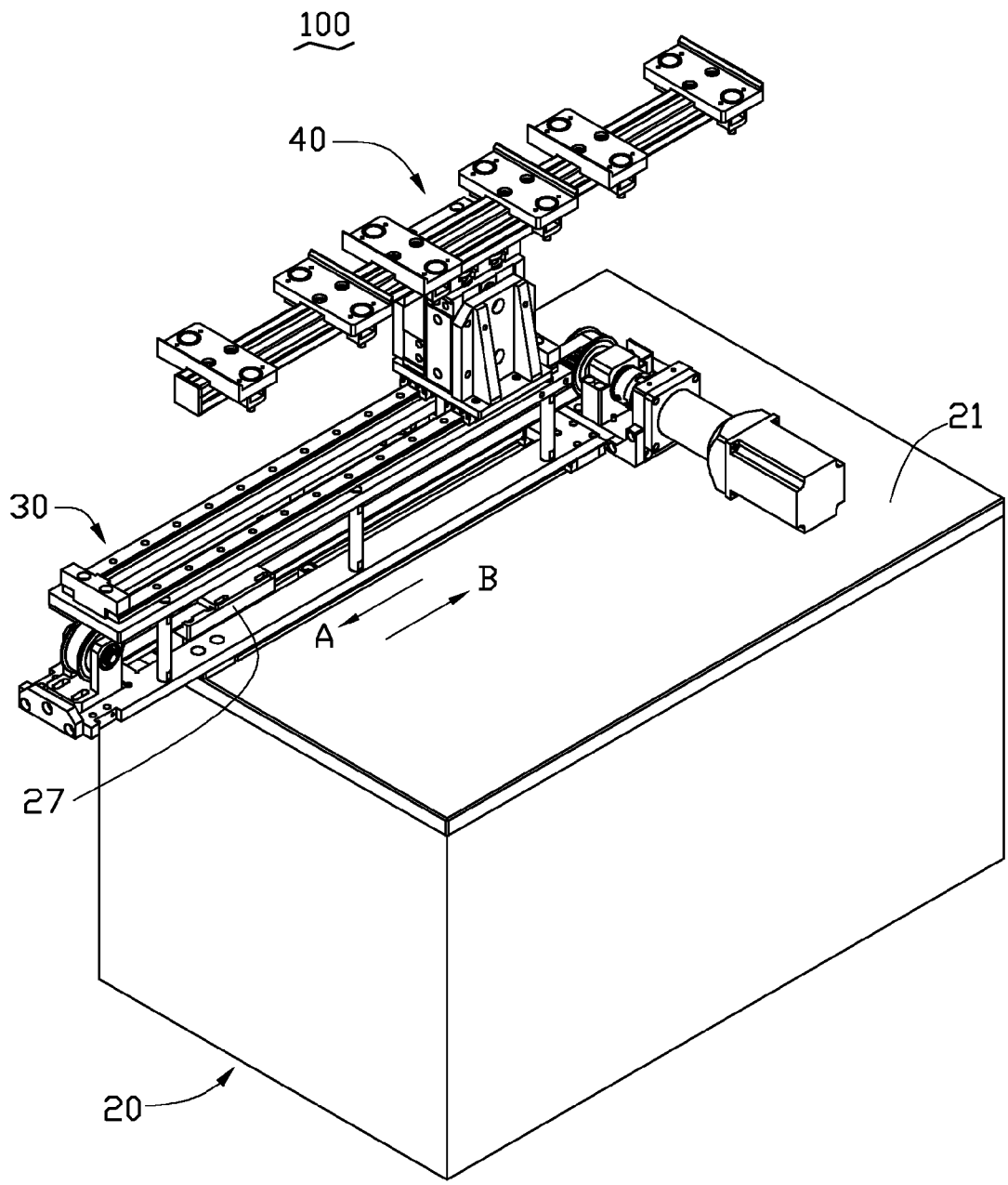
FIG. 1 is an assembled, isometric view of an embodiment of a conveying device, wherein the conveying device includes a base, a sliding mechanism and a bearing mechanism.

Referring to FIG. 1, an embodiment of a conveying device 100 includes a base 20, a sliding mechanism 30 and a bearing mechanism 40. The sliding mechanism 30 is slidably mounted on the base 20 along a preset path. The bearing mechanism 40 is also slidably mounted on the sliding mechanism 30 for bearing and carrying workpieces or products.

Figure 2:
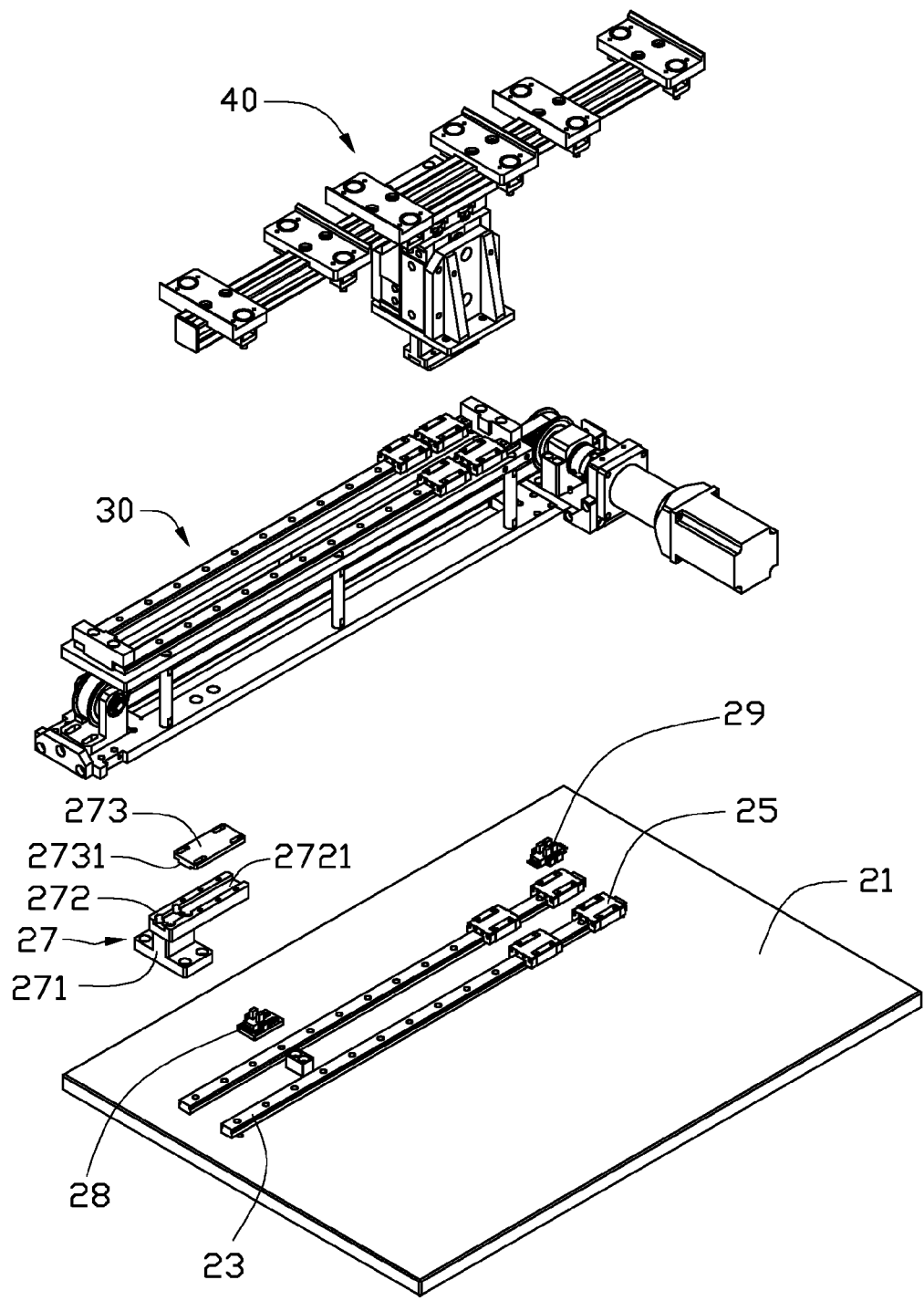
FIG. 2 shows an exploded, isometric, partial view of the conveying device of FIG. 1.

Also referring to FIG. 2, the base 20 includes a mounting plate 21, two first parallel sliding rails 23 mounted on the mounting plate 21, four first sliding blocks 25, a fixed bracket 27, a first sensor 28 and a second sensor 29. The four first sliding blocks 25 are slidably assembled to the two first sliding rails 23. Each sliding rail 23 is assembled with two sliding blocks 25. The fixed bracket 27 is fixed on the mounting plate 21 and positioned adjacent to one end of the first sliding rail 23. The first sensor 28 and the second sensor 29 are oppositely mounted on the mounting plate 21 and are adjacent to opposite ends of the first guiding rail 23, respectively. The number of the first sliding rail 23 is not limited to two, it can also be one or more than two. The number of the first sliding blocks 25 is also not limited to four, it can be two, three, or more than four, according to need.

The fixed bracket 27 includes a substantially inverted T-shaped base portion 271, a support portion 272, and a cover plate 273. The support portion 272 is mounted on the base portion 271 and defines a bar-shaped engaging slot 2721 in a surface away from the base portion 271. The cover plate 273 is fixed on the support portion 272 and includes an engaging protrusion 2731 formed thereon for engaging with the engaging slot 2721 of the support portion 272.

Figure 3:
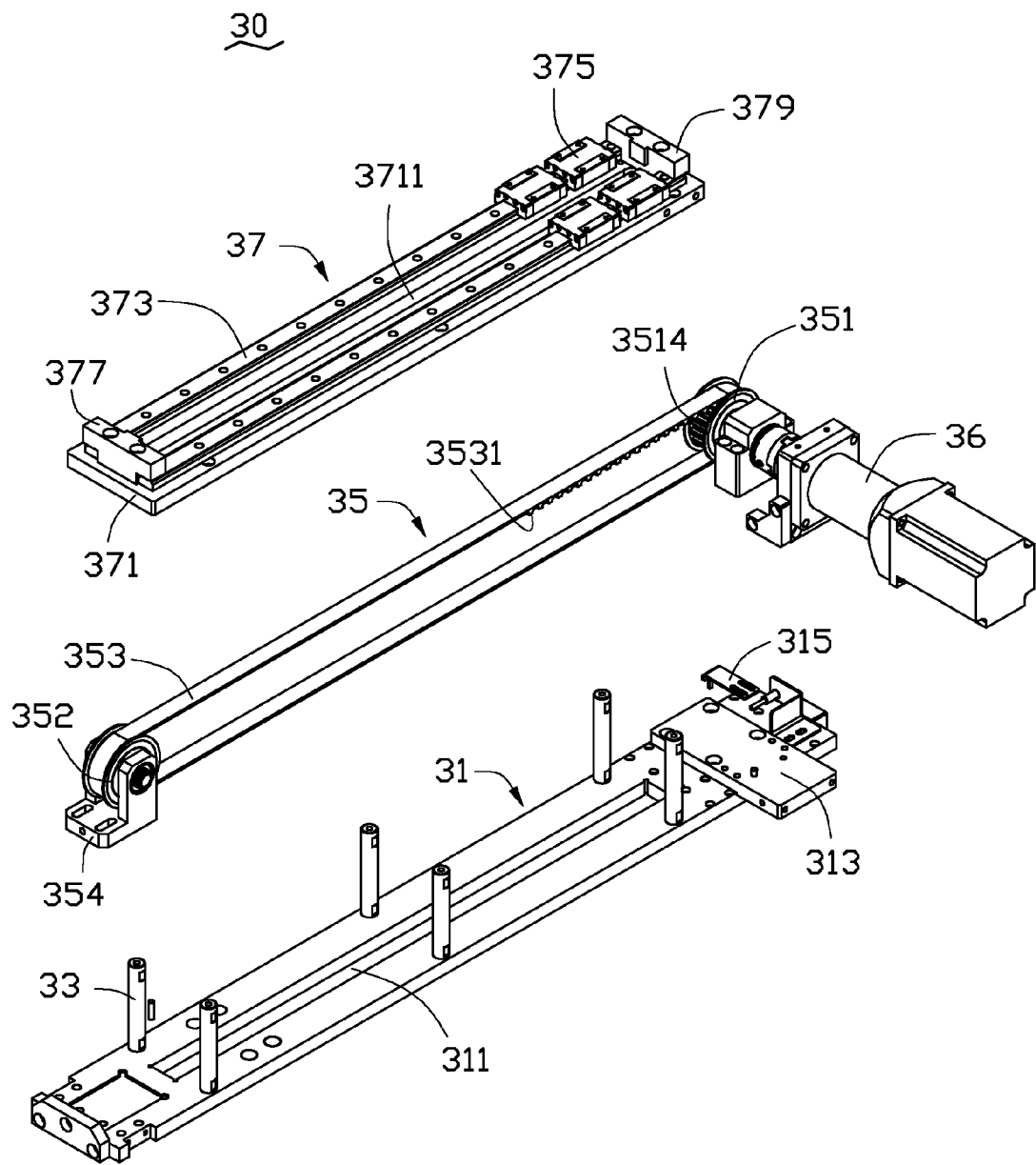
FIG. 3 shows an exploded, isometric view of the sliding mechanism of the conveying device of FIG. 2.

Also referring to FIG. 3, the sliding mechanism 30 includes a bottom plate 31, a plurality of support posts 33 separately formed on the bottom plate 31, a conveying assembly 35, a driver 36 and a mounting platform 37. The conveying assembly 35 is mounted on the bottom plate 31. The driver 36 connects with the conveying assembly 35 for driving the conveying assembly 35 to work. The mounting platform 37 is positioned above the bottom plate 31 and fixedly supported by the support posts 33.

The bottom plate 31 is a substantially rectangular plate, and defines a bar-shaped longitudinal sliding slot 311. A fixing plate 313 is fixed adjacent to a first distal end of the bottom plate 31. A sensing sheet 315 is fixed to the first distal end of the bottom plate 31 and positioned adjacent to the fixing plate 313. In the illustrated embodiment, there are six support posts 33 separately disposed at two sides of the sliding slot 311 of the bottom plate 31 longitudinally. The driver 36 is a driving motor mounted on the fixing plate 313 of the bottom plate 31 and connected with the sensing sheet 315.

The conveying assembly 35 includes a driving wheel 351, a driven member 352, a conveying belt 353, and a fixing base 354. The driving wheel 351 is rotatably assembled with the driver 36 and positioned adjacent to the sensing sheet 315 at the first distal end of the bottom plate 31. The driving wheel 351 is driven by the driver 36 to rotate clockwise or counterclockwise. The driving wheel 351 has a plurality of engaging teeth 3514 on a peripheral surface thereof. The fixing base 354 is fixed on the bottom plate 31 and positioned adjacent to a second distal end of the bottom plate 31 away from the sensing sheet 315 and the driving wheel 351. The driven member 352 is rotatably mounted to the fixing base 354 and positioned opposite to the driving wheel 351. The conveying belt 353 is sleeved on the driving wheel 351 and the driven member 352 for connecting the driving wheel 351 and the driven member 352 together. The conveying belt 353 includes a saw-shaped engaging portion 3531 formed on an inner surface thereof, for engaging with the engaging teeth 3514 of the driving wheel 351.

The mounting platform 37 is fixed with the support posts 33 and positioned above the bottom plate 31. The mounting platform 37 includes a base plate 371, two parallel second sliding rails 373 formed on the base plate 371, four second sliding blocks 375, a first stopper 377 and a second stopper 379. The four second sliding blocks 375 are slidably assembled to the two second sliding rails 373. Each second sliding rail 373 is assembled with two second sliding blocks 375. The first stopper 377 and the second stopper 379 are oppositely mounted to two ends of the second sliding rail 373. In the illustrated embodiment, the base plate 371 is substantially rectangular, and defines a bar-shaped sliding groove 3711 longitudinally. The two second sliding rails 373 are oppositely formed on two sides of the sliding groove 3711 of the base plate 371. The number of the second sliding rail 373 is not limited to two, it can also be one or more than two. The number of the second sliding blocks 375 is also not limited to four, it can be two, three, or more than four, according to need.

Figure 4:
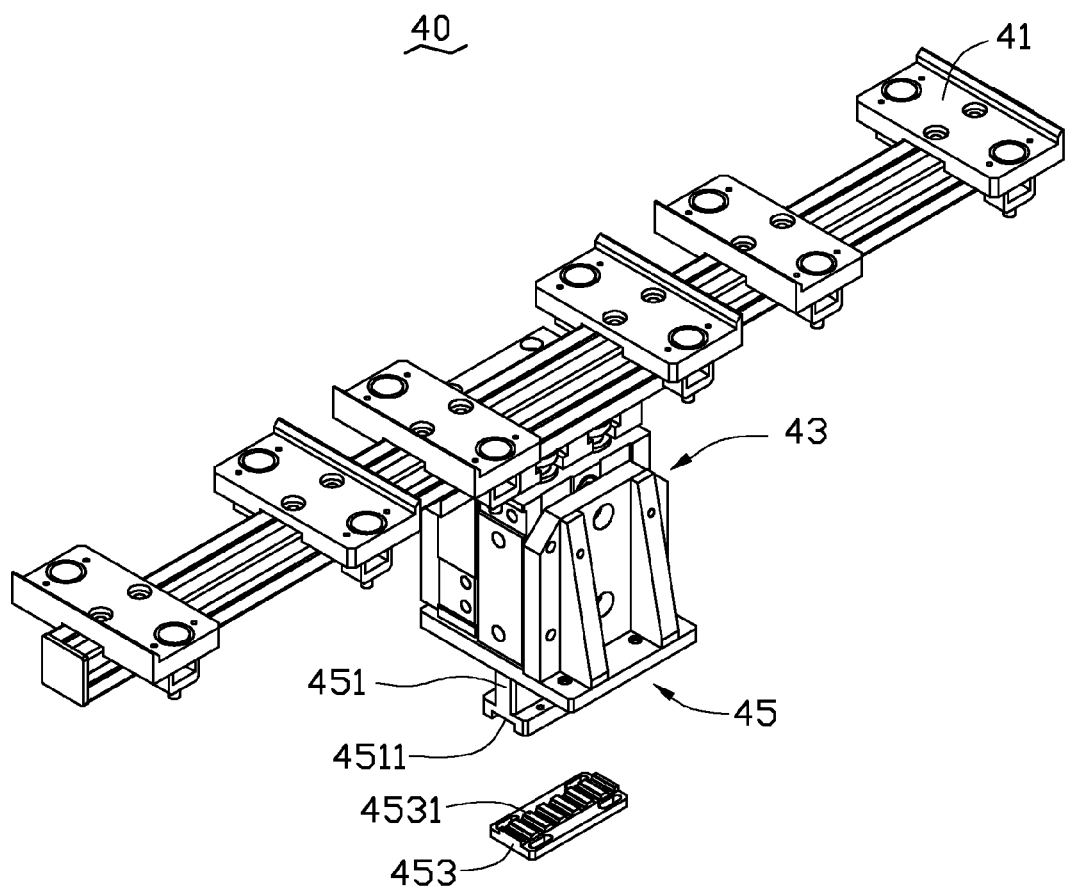
FIG. 4 shows an exploded, isometric view of the bearing mechanism of the conveying device of FIG. 2.

Also referring to FIG. 4, the bearing mechanism 40 includes a bearing platform 41, a support base 43 and a fixed support 45. The bearing platform 41 and the fixed support 45 are oppositely mounted to a top end of the support base 43 and a bottom end of the support base 43. The fixed support 45 includes a support body 451 and a pressing body 453 fixed with the support body 451. The support body 451 is fixed to the support base 43 and defines a mounting slot 4511 at a bottom end of the support body 451. The pressing body 453 is a rectangular block and is fixedly received in the mounting slot 4511 of the support body 451. The pressing body 453 defines a serrated latching portion 4531 corresponding to the engaging teeth 3514 of the driving wheel 351 and the engaging portion 3531 of the conveying belt 353.

When assembling the conveying device 100, the bottom plate 31 of the sliding mechanism 30 is fixed to the first sliding blocks 25 of the base 20. The fixed bracket 27 passes through the sliding slot 311 and is fixed with the bottom side portion of the conveying belt 353. The bottom side portion of the conveying belt 353 that is positioned adjacent to the driven member 352 is fixedly sandwiched between the support portion 272 and the cover plate 273. The support base 43 of the bearing mechanism 40 is fixed to the second sliding blocks 375 of the sliding mechanism 30. The fixed support 45 of the bearing mechanism 40 passes through the sliding groove 3711 of the base plate 371 of the sliding mechanism 30, and is further fixed with the engaging portion 3531 of the conveying belt 353. The engaging portion 3531 of the conveying belt 353 engages with the latching portion 4531 of the pressing body 453 and the engaging teeth 3514 of the driving wheel 351, and is fixedly sandwiched between the support body 451 and the pressing body 453 of the fixed support 45. In the illustrated embodiment, the first sensor 28 is mounted on the mounting plate 21 and positioned adjacent to the fixed bracket 27. The second sensor 29 is oppositely mounted on the mounting plate 21 and positioned adjacent to the driving wheel 351.

Referring to FIGS. 1 and 3, in use, when the driving wheel 351 is driven by the driver 36 to rotate counterclockwise, a belt portion of the conveying belt 353 which connects the driving wheel 351 and the fixed bracket 27 is tensioned along the direction A, as shown in FIG. 1. Since the bottom side portion of the conveying belt 353 is fixed with the fixed bracket 27, a driving force along the direction A is thus applied to the conveying belt 353 thereby driving the sliding mechanism 30 to slide along the first sliding rail 23 towards the fixed bracket 27. Meanwhile, the belt portion of the conveying belt 353 which connects the driving wheel 351 and the fixed support 45 of the bearing mechanism 40 is loosened. The belt portion of the conveying belt 353 which connects the driven member 352 and the fixed support 45 is tensioned, thereby driving the bearing mechanism 40 to slide relative to the second sliding rail 373, along a same direction together with the sliding mechanism 30, until the sensing sheet 315 reaches and aligns with the first sensor 28. As the sensing sheet 315 aligns with and senses the presence of the first sensor 28, the sensing sheet 315 sends out a stop signal to stop the driver 36 thereby preventing the sliding mechanism 30 and the bearing mechanism 40 from further sliding.

When the driving wheel 351 is driven by the driver 36 to rotate clockwise, the belt portion of the conveying belt 353 which connects the driving wheel 351 and the fixed support 45 of the bearing mechanism 40 is tensioned along direction B as shown in FIG. 1. Since the engaging portion 3531 of the conveying belt 353 is fixed with the fixed support 45 of the bearing mechanism 40, a driving force along the direction B is thus applied to drive the bearing mechanism 40 slide along the second sliding rail 373 toward the driver 36. Meanwhile, the belt portion of the conveying belt 353 that connects the driving wheel 351 and the fixed bracket 27 is tensioned, thereby driving the sliding mechanism 30 to slide relative to the first sliding rail 23, along a same direction together with the bearing mechanism 40, until the sensing sheet 315 reaches and aligns with the second sensor 29. As the sensing sheet 315 aligns with and senses the presence of the second sensor 29, the sensing sheet 315 sends out a stop signal to stop the driver 36 thereby preventing the sliding mechanism 30 and the bearing mechanism 40 from further sliding.

In one embodiment, the sensing sheet 315, the first sensor 28 and the second sensor 29 may also be omitted, the driver 36 may be driven by a controller or manually controlled.

While various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A conveying device, comprising:
    a base comprising a mounting plate and a fixed bracket fixed on the mounting plate;
    a sliding mechanism comprising:
        a bottom plate slidably mounted on the mounting plate;
        a mounting platform fixedly mounted upon the bottom plate;
        a conveying assembly mounted on the bottom plate and positioned under the mounting platform, the conveying assembly comprising a driving wheel, a driven member, and a conveying belt sleeved on the driving wheel and the driven member; and
        a driver mounted on the bottom plate for driving the corresponding driving wheel to rotate; and
    a bearing mechanism slidably mounted on the mounting platform of the sliding mechanism, and fixed with the conveying belt;
    wherein the driving wheel and the driven member are oppositely and rotatably mounted on the bottom plate, the fixed bracket is positioned adjacent to the driven member and fixed with the conveying belt.

2. The conveying device of claim 1, wherein the bottom plate defines a sliding slot, the driving wheel and the driven member are oppositely positioned adjacent to two ends of the sliding slot; the fixed bracket passes through the sliding slot and fixed with conveying belt.

3. The conveying device of claim 2, wherein the mounting platform defines a sliding groove parallel to the sliding slot of the bottom plate and positioned upon the sliding slot, the bearing mechanism passes through the sliding groove and fixed with the conveying belt.

4. The conveying device of claim 2, further comprising two sensors and a sensing sheet, wherein the two sensors are oppositely mounted on the mounting plate and positioned adjacent to two ends of the sliding slot, respectively; the sensing sheet is mounted to the bottom plate and positioned adjacent to the driving wheel, and connected with the driver; when the sensing sheet aligns with and senses one of the two sensors, the sensing sheet is capable of sending out a stop signal to stop the driver.

5. The conveying device of claim 2, wherein the sliding mechanism further comprises a plurality of support posts separately formed on the bottom plate and positioned at two sides of the sliding slot longitudinally; the mounting platform is fixed to the distal ends of the support posts and positioned above the bottom plate parallely.

6. The conveying device of claim 4, wherein the conveying assembly further comprises a fixing base fixed on the bottom plate and positioned away from the sensing sheet and the driving wheel, the driven member is rotatably mounted to the fixing base and positioned opposite to the driving wheel.

7. The conveying device of claim 3, wherein the driving wheel forms a plurality of engaging teeth on a peripheral surface thereof, the conveying belt forms a substantially serrate shaped engaging portion on an inner surface thereof, for engaging with corresponding engaging teeth of the driving wheel.

8. The conveying device of claim 7, wherein the mounting platform comprises a base plate, at least one sliding rail formed on the base plate, and at least one sliding block slidably assembled to the sliding rail, the base plate is parallely mounted upon the bottom plate; and the sliding groove is defined through the base plate longitudinally.

9. The conveying device of claim 8, wherein the mounting platform further comprises a first stopper and a second stopper, the first stopper and the second stopper are oppositely mounted to two ends of the at least one sliding rail.

10. The conveying device of claim 8, wherein the bearing mechanism comprises a bearing platform, a support base and a fixed support; the bearing platform and the fixed support are oppositely mounted to a top end of the support base and a bottom end of the support base; the fixed support passes through the sliding groove and is fixed with the conveying belt.

11. The conveying device of claim 10, wherein the fixing support comprises a support body fixed to the support base and a pressing body fixed with the support body, the support body defines a mounting slot at a bottom end thereof, the pressing body is fixedly received within the mounting slot of the support body; the pressing body defines a serrate shaped latching portion engaging with the engaging teeth of the driving wheel and the engaging portion of the conveying belt; the engaging portion of the conveying belt is fixedly sandwiched between the support body and the pressing body of the fixed support.

12. A conveying device, comprising:
a base comprising a mounting plate and a fixed bracket fixed on the mounting plate;
a sliding mechanism comprising:
a bottom plate slidably mounted on the mounting plate and defining a sliding slot longitudinally;
a mounting platform fixedly mounted upon the bottom plate;
a conveying assembly mounted on the bottom plate and positioned under the mounting platform, the conveying assembly comprising a driving wheel, a driven member, and a conveying belt sleeved on the driving wheel and the driven member; the driving wheel and the driven member oppositely positioned adjacent to two ends of the sliding slot; and
a driver mounted on the bottom plate and for driving the corresponding driving wheel to rotate; and
a bearing mechanism slidably mounted on the mounting platform of the sliding mechanism, and fixed with the conveying belt;
wherein, the fixed bracket passes through one end of the sliding slot and fixed with the conveying belt, the fixed bracket comprises a support portion and a cover plate fixed on the support portion, a bottom side portion of the conveying belt adjacent to the driven member is fixedly sandwiched between the support portion and the cover plate.

13. The conveying device of claim 12, wherein the mounting platform comprises a base plate, at least one sliding rail formed on the base plate, and at least one sliding block slidably assembled to the sliding rail, the base plate is parallely mounted upon the bottom plate and defines a sliding groove longitudinally parallel to the sliding slot; the bearing mechanism passes through the sliding groove and fixed with the conveying belt.

14. The conveying device of claim 13, wherein the sliding mechanism further comprises a plurality of support posts separately formed on the bottom plate and positioned at two sides of the sliding slot longitudinally; the mounting platform is fixed to distal ends of the support posts and positioned above the bottom plate parallely.

15. The conveying device of claim 14, wherein the bearing mechanism comprises a bearing platform, a support base and a fixed support, the bearing platform and the fixed support are oppositely mounted to a top end of the support base and a bottom end of the support base; the fixed support passes through the sliding groove and fixed with the conveying belt.

\* \* \* \* \*